C. R. MILLER.
EXPLOSION ENGINE STARTER.
APPLICATION FILED SEPT. 28, 1914.
1,133,737.
Patented Mar. 30, 1915.
2 SHEETS—SHEET 1.
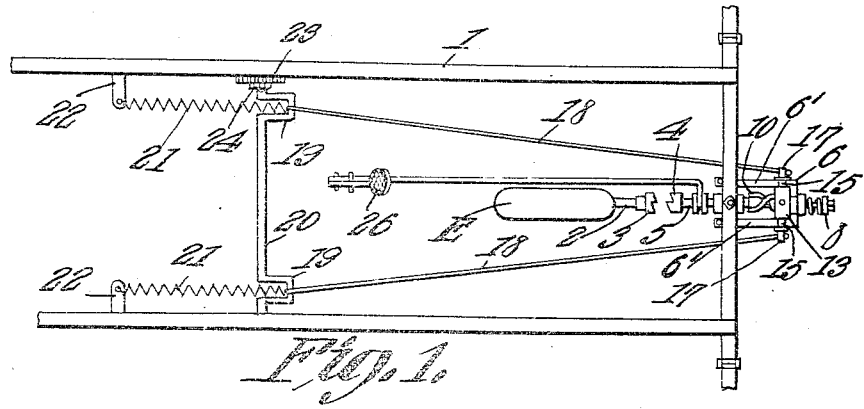
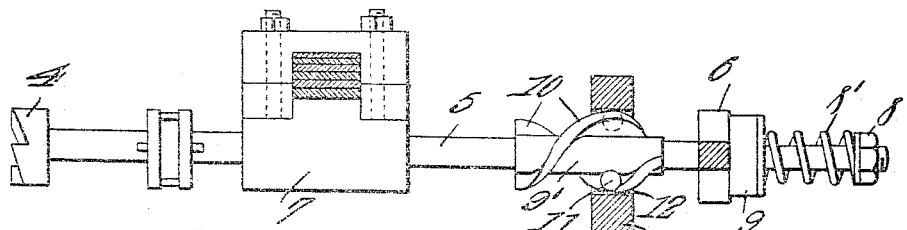
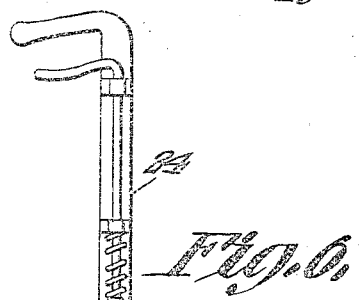
Witnesses
C. R. Miller,
Inventor
by
Attorneys

C. R. MILLER.
EXPLOSION ENGINE STARTER.
APPLICATION FILED SEPT. 28, 1914.

1,133,737.

Patented Mar. 30, 1915.
2 SHEETS—SHEET 2.

Witnesses

C. R. Miller,
Inventor
by
Attorneys

UNITED STATES PATENT OFFICE.

CHARLES R. MILLER, OF WHITESBORO, TEXAS.

EXPLOSION-ENGINE STARTER.

1,133,737.  Specification of Letters Patent.  Patented Mar. 30, 1915.

Application filed September 28, 1914. Serial No. 863,935.

*To all whom it may concern:*

Be it known that I, CHARLES R. MILLER, a citizen of the United States, residing at Whitesboro, in the county of Grayson and State of Texas, have invented a new and useful Explosion-Engine Starter, of which the following is a specification.

The present invention relates to improvements in explosion engine starters, one object of the invention, is the provision of a mechanical starting mechanism adapted to displace the ordinary hand crank upon explosion engines either in an automobile or marine engine, the same when attached to the automobile being readily operable by the chauffeur or operator from his seat, and being thrown into operation by the foot and operated by hand to impart the necessary rotation at the initial starting of the crank shaft.

A further object of the present invention, is the provision of an attachment adapted to be connected to the frame of an automobile to be placed into and out of operation with the crank shaft of the engine, the mechanism including a worm or spiral in combination with a surrounding frame disposed for reciprocation relatively to the worm or spiral to impart the desired rotation thereto at the initial starting of the crank shaft.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 3:
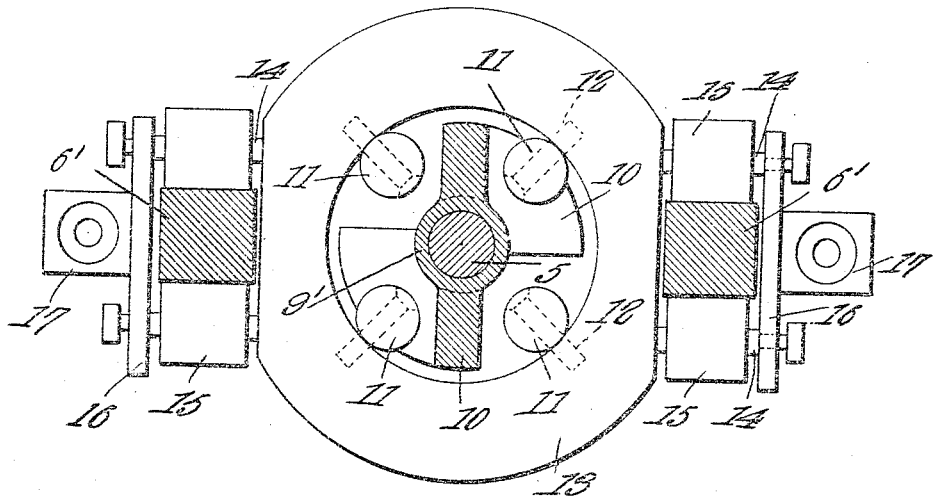
Figure 4:
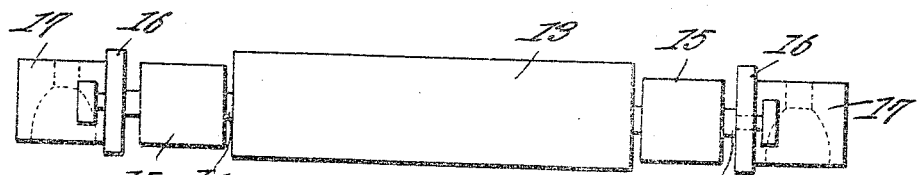
Figure 5:
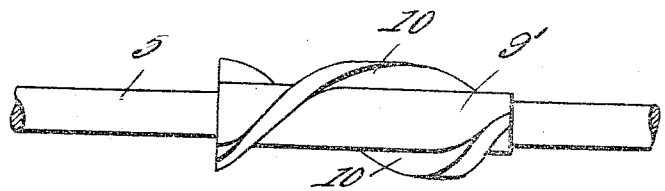

In the drawings—Figure 1 is a top plan partially diagrammatic of an automobile showing the present invention applied thereto. Fig. 2 is a top plan view on an enlarged scale of the device adjacent the crank shaft engaging portion of the engine. Fig. 3 is a front elevation thereof. Figs. 4, 5 and 6 are detail views of various parts thereof.

Referring to the drawings, E designates the engine, mounted and supported from the automobile frame 1, the crank shaft 2 thereof being provided with the crank operating end 3 which is adapted to be engaged by the reduced member 4 which is carried upon the rotatable and longitudinally slidable shaft 5. This shaft is journaled in the frame 6, which when the present device is adapted to be used with an automobile of the "Ford" type, is attached as at 7 to the bosses thereof. Attached to the forward end of the shaft 5 are the two nuts or washers 8 which coöperate with the ball bearing member 9 to take care of the thrust of the shaft 5, when the same is moved to be placed in engagement with the crank shaft of the engine. Formed upon or carried by the shaft 5 intermediate of its ends, is the sleeve 9' provided with the two spirals 10 which thus provide an abutting means to coöperate with the anti-frictional rollers 11 supported radially upon the pins 12 within the annulus 13. This annulus 13 is provided with two pairs of oppositely extending pins 14, upon each of which is mounted, the anti-frictional roller 15 while attached upon the pins 14 and properly spaced therefrom, by the enlarged portions 14' of such pins, is the plate 16, there being two in the present instance. The longitudinal side members 6' of the frame 6 are placed between the anti-frictional rollers 15 so that the annulus 13 may be reciprocated thereon with the least possible friction.

In order to provide a means for reciprocating the annulus 13, connected to the two respective apertured lugs 17 are the two rearwardly extending rods 18. The rear ends of these rods 18 are connected to the cranks 19 of the transversely mounted shaft 20. Also connected to the cranks 19 and extending in a rearward direction, are the springs 21 whose rear ends are attached to the frame of the automobile as at 22.

In order to provide a means for rotating the shaft 20 and consequently coöperating with the springs 21 to reciprocate the annulus 13, and thus impart the desired rotation through the spiral or worm member 9 to the shaft 5, the ratchet wheel 23 is fixed to the shaft 20 at one side and is operated by the manually controlled lever 24 carrying the manually released pawl 25. It will thus be seen that when the lever 24 is oscillated and through the pawl 25 and the ratchet 23 has imparted the desired rotation to the shaft 20, the cranks 19 will slide the annulus 13 forwardly and rotate the shaft 5. As the annulus is placed in the position so that when the foot lever or treadle 26 is depressed it places the crank shaft engaging member 4 in engagement with the starting crank operating end 3 of the crank shaft of the engine, the springs 21 due to the continued rotation of the shaft 20 and the manual release of the pawl 25 from the ratchet 23 will assist in rapidly moving the annulus 13 to the rear or toward the engine, and thus the rollers 11 will cause the spiral member 9 to be rotated and rotate the shaft 5 to impart the desired rotation at the initial starting of the crank of the engine. It will thus be seen that the cranks 19 are operated to move the annulus 13 in its extreme forward position before the shaft 5 is slid toward the crank shaft of the engine to cause the same to be engaged thereto.

It will thus be seen that with this construction, that the engine may be cranked without the operator leaving his seat, and that the springs may be of such a strength as to impart the desired sliding movement to the annulus 13 to cause the starting shaft 5 to be rotated and when connected with the engine shaft, operate the engine shaft at the initial starting thereof.

What is claimed is:

1. The combination with an explosion engine, having a starting crank receiving connection, of a starting device, including a frame, a longitudinally slidable rotary shaft mounted in the frame, means carried upon one end thereof for engagement with the crank receiving means of the engine, a member carrying a spiral fixed to the shaft within the frame, an annulus surrounding the shaft and slidably mounted within the frame, said annulus being held against rotary movement, means carried by the annulus for engaging the spiral, two rods connected to the annulus, a transverse shaft having two cranks, each crank being connected to its respective rod, means for rotating the transverse shaft to reciprocate the annulus, and a spring connected to the transverse shaft for operating said transverse shaft and the annulus to impart rotation to the longitudinally slidable rotary shaft in engine starting direction.

2. The combination with an explosion engine, having a starting crank receiving connection, of a starting device, including a frame, a longitudinally slidable rotary shaft mounted in the frame, means carried upon one end thereof for engagement with the crank receiving means of the engine, a member carrying a spiral fixed to the shaft within the frame, an annulus surrounding the shaft and slidably mounted within the frame, said annulus being held against rotary movement, means carried by the annulus for engaging the spiral, two rods connected to the annulus, a transverse shaft having two cranks, each crank being connected to its respective rod, means for rotating the transverse shaft to reciprocate the annulus, a spring connected to the transverse shaft for operating said transverse shaft and the annulus to impart rotation to the longitudinally slidable rotary shaft in engine starting direction, and manually controlled means for sliding the shaft to connect the same to the crank shaft of the engine.

In testimony that I claim the foregoing as my own, I have hereto affixed my signature in the presence of two witnesses.

CHARLES R. MILLER.

Witnesses:
B. BENNETT,
GEO. H. WADE.